US007963269B2

(12) United States Patent
Kaneko et al.

(10) Patent No.: US 7,963,269 B2
(45) Date of Patent: Jun. 21, 2011

(54) IGNITION TIMING CONTROLLING APPARATUS AND IGNITION TIMING CONTROLLING METHOD FOR INTERNAL COMBUSTION ENGINE

(75) Inventors: Rihito Kaneko, Nishikamo-gun (JP); Hiroto Tanaka, Toyota (JP); Satoshi Watanabe, Okazaki (JP); Norihito Hanai, Toyota (JP); Yasuhiro Yamasako, Toyota (JP); Kenji Senda, Okazaki (JP); Satoshi Masuda, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 426 days.

(21) Appl. No.: 12/263,216

(22) Filed: Oct. 31, 2008

(65) Prior Publication Data
US 2009/0120410 A1 May 14, 2009

(30) Foreign Application Priority Data

Nov. 13, 2007 (JP) ................................. 2007-294456

(51) Int. Cl.
*F02P 5/00* (2006.01)

(52) U.S. Cl. ......... 123/406.24; 123/406.33; 123/406.38; 701/111

(58) Field of Classification Search ............. 123/406.16, 123/406.21, 406.24, 406.29, 406.33, 406.37, 123/406.38, 406.39; 701/111
See application file for complete search history.

(56) References Cited

U.S. PATENT DOCUMENTS

| 4,240,388 A | 12/1980 | Omori et al. |
| 4,268,910 A | 5/1981 | Omori et al. |
| 4,777,920 A | 10/1988 | Oshiage et al. |
| 4,993,387 A * | 2/1991 | Sakakibara et al. ..... 123/406.33 |
| 5,134,980 A | 8/1992 | Sakakibara et al. |
| 5,188,080 A | 2/1993 | Sakakibara et al. |
| 5,386,722 A | 2/1995 | Meyer et al. |
| 6,688,286 B2 | 2/2004 | Kokubo et al. |
| 6,845,312 B1 * | 1/2005 | Cross et al. ................... 701/111 |
| 7,133,766 B2 | 11/2006 | Kokubo |
| 7,392,788 B2 * | 7/2008 | Kaneko et al. ........... 123/406.29 |
| 7,478,622 B2 * | 1/2009 | Kaneko et al. ........... 123/406.29 |
| 7,478,624 B2 | 1/2009 | Kaneko et al. |
| 7,588,015 B2 * | 9/2009 | Kaneko et al. ........... 123/406.21 |
| 7,637,247 B2 * | 12/2009 | Kaneko et al. ........... 123/406.29 |
| 7,643,932 B2 * | 1/2010 | Iwade et al. ................... 701/111 |
| 7,653,477 B2 * | 1/2010 | Yoshihara et al. ............ 701/111 |

(Continued)

FOREIGN PATENT DOCUMENTS

DE 32 33 373 A1 3/1983

(Continued)

*Primary Examiner* — Thomas N Moulis
(74) *Attorney, Agent, or Firm* — Kenyon & Kenyon LLP

(57) ABSTRACT

A 90° integrated value calculating unit of an engine ECU calculates a 90° integrated value obtained by integrating a magnitude. A calculating unit calculates a knock magnitude by dividing 90° integrated value by a BGL. A value obtained by subtracting a standard deviation σ from a median value of 90° integrated value is determined as the BGL. An ignition timing control unit controls the ignition timing depending on whether knock magnitude is equal to or larger than a determination value. A median value calculating unit calculates median value of 90° integrated value. A standard deviation calculating unit calculates standard deviation of 90° integrated value. A first stop unit stops updating of median value and standard deviation when 90° integrated value is smaller than a first threshold value or is equal to or larger than a second threshold value.

7 Claims, 11 Drawing Sheets

U.S. PATENT DOCUMENTS

| | | | |
|---|---|---|---|
| 7,669,582 B2 * | 3/2010 | Kaneko et al. | 123/406.21 |
| 7,853,400 B2 * | 12/2010 | Matsushima et al. | 701/111 |
| 2002/0179053 A1 | 12/2002 | Kokubo et al. | |
| 2004/0084022 A1 | 5/2004 | Kinose | |
| 2006/0288981 A1 | 12/2006 | Kaneko et al. | |
| 2006/0288982 A1 * | 12/2006 | Kaneko et al. | 123/406.39 |
| 2007/0084266 A1 | 4/2007 | Kaneko et al. | |
| 2007/0175444 A1 | 8/2007 | Kaneko et al. | |
| 2009/0120410 A1 * | 5/2009 | Kaneko et al. | 123/406.38 |
| 2009/0165746 A1 * | 7/2009 | Aso et al. | 123/406.38 |
| 2009/0217908 A1 * | 9/2009 | Watanabe et al. | 123/406.37 |
| 2010/0212634 A1 * | 8/2010 | Yoshihara et al. | 123/406.24 |

FOREIGN PATENT DOCUMENTS

| | | |
|---|---|---|
| DE | 690 25 915 T2 | 9/1996 |
| DE | 10 2006 000 312 A1 | 3/2007 |
| DE | 10 2007 000 041 A1 | 8/2007 |
| EP | 0 293 573 A1 | 12/1988 |
| EP | 0 859 149 A2 | 8/1998 |
| JP | 3-070844 A | 3/1991 |
| JP | 4-252840 A | 9/1992 |
| JP | 2605805 B2 | 2/1997 |
| JP | 2730215 B2 | 12/1997 |
| JP | 2002-188504 A | 7/2002 |
| JP | 2004-150378 A | 5/2004 |
| JP | 2007-009725 A | 1/2007 |
| JP | 2007-255195 A | 10/2007 |
| JP | 2007-255212 A | 10/2007 |
| JP | 2008-088917 A | 4/2008 |
| WO | 2007066785 A1 | 6/2007 |
| WO | 2007080815 A1 | 7/2007 |

\* cited by examiner

F I G. 1
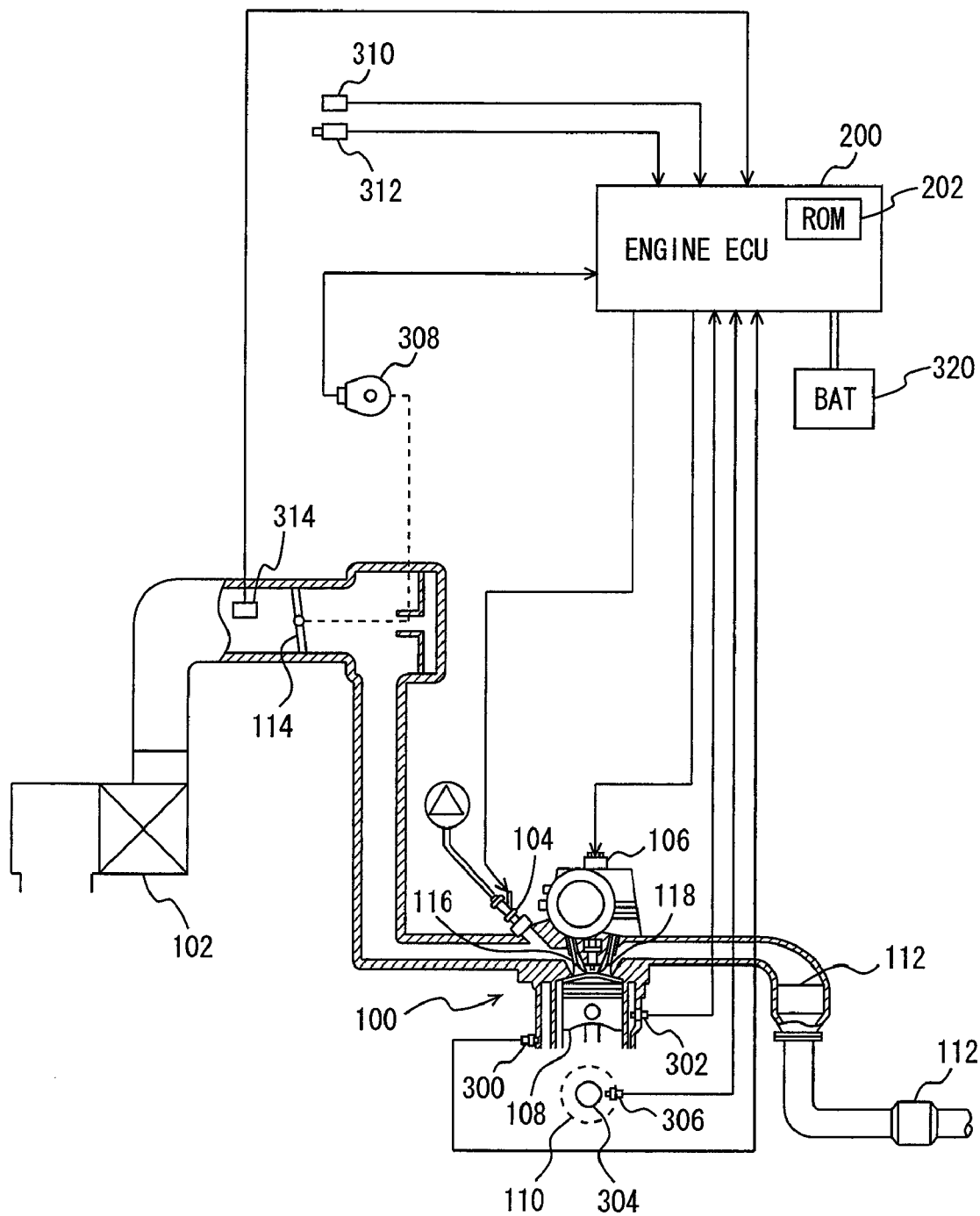

IGNITION TIMING CONTROLLING APPARATUS AND IGNITION TIMING CONTROLLING METHOD FOR INTERNAL COMBUSTION ENGINE

This nonprovisional application is based on Japanese Patent Application No. 2007-294456 filed on Nov. 13, 2007 with the Japan Patent Office, the entire contents of which are hereby incorporated by reference.

BACKGROUND OF THE INVENTION

1. Field of the Invention

The present invention relates to an ignition timing control apparatus and an ignition timing control method for an internal combustion engine, and particularly to a technique of controlling ignition timing according to a result of comparison between a magnitude (intensity) of vibration of an internal combustion engine and a determination value.

2. Description of the Background Art

Conventionally, various methods of determining whether knocking (knock) is present or absent have been proposed. For example, there is a technique of determining whether a magnitude of vibration detected in an internal combustion engine is larger than a determination value or not, and thereby determining whether knocking has occurred or not. However, the magnitude of vibration detected in the internal combustion engine may change due to secular changes in the internal combustion engine and a knock sensor. Also, the magnitude of vibration detected in a certain internal combustion engine may be different from those of other internal combustion engines. For precisely determining the presence/absence of the knocking, therefore, it is desired to correct the knock determination value according to the magnitude that is actually detected in the internal combustion engine.

Japanese Patent Laying-Open No. 2007-255195 has disclosed an ignition timing control apparatus for an internal combustion engine, including a detecting unit for detecting for a plurality of times a magnitude of vibration occurring in an internal combustion engine; a first calculating unit for calculating a knock magnitude related to a magnitude of vibration due to knocking, in accordance with each magnitude detected by the detecting unit; a controlling unit for controlling ignition timing of the internal combustion engine, based on a result of comparison between the knock magnitude and a predetermined first determination value; a second calculating unit for calculating a median value and a standard deviation of the magnitudes detected by the detecting unit; and a second correcting unit for correcting the first determination value so that a degree of ignition timing being retarded by the controlling unit becomes greater when a second determination value calculated by adding a product of the standard deviation and a predetermined coefficient to the median value is greater than the first determination value. The knock magnitude is calculated by dividing the magnitude of vibration by a BGL (Back Ground Level). The BGL is calculated by subtracting the product of the standard deviation and the coefficient from the median value.

According to the ignition timing control apparatus disclosed in the above publication detects multiple times the magnitude of the vibration occurring in the internal combustion engine. The knock magnitude related to the magnitude of the vibration that is caused by knocking is calculated according to each magnitude thus detected. The ignition timing of the internal combustion engine is controlled based on a result of the comparison between this knock magnitude and the predetermined determination value. For example, when the knock magnitude is larger than the determination value, the ignition timing is retarded. When the knock magnitude is smaller than the determination value, the ignition timing is advanced. When the second determination value calculated by adding the product of the standard deviation and the predetermined coefficient to the median value is larger than the first determination value, the first determination value is corrected and increased by an extent to which the control unit retards the ignition timing. Thereby, in a state where the knocking occurs frequently, it is possible to suppress excessive increase of the determination value to be compared with the magnitude of vibration with respect to the vibration occurring in the internal combustion engine. Therefore, the ignition timing can be retarded easily. Consequently, occurrence of the knocking can be suppressed.

When the load of the internal combustion engine suddenly changes, sudden changes necessarily occur in magnitude of the vibration. Thereby, the standard deviation of the magnitude may increase suddenly. Therefore, in the case where the knock magnitude is calculated according to the standard deviation of the magnitude, as is done in the ignition timing control apparatus disclosed in Japanese Patent Laying-Open No. 2007-255195, the knock magnitude may suddenly increase at the time of change of load the internal combustion engine even when the knocking has not occurred. In this case, the ignition timing is erroneously retarded.

SUMMARY OF THE INVENTION

An object of the present invention is to provide an ignition timing control apparatus and an ignition timing control method for an internal combustion engine that can accurately control ignition timing.

An ignition timing controlling apparatus for an internal combustion engine includes a knock sensor detecting a magnitude of vibration of the internal combustion engine in a plurality of ignition cycles, and a control unit. The control unit calculates a first value representing a median value of the magnitude, a second value representing a standard deviation of the magnitude, a third value corresponding to the first and second values and a fourth value corresponding to the magnitude and the third value, controls the ignition timing of the internal combustion engine according to a result of comparison between the fourth value and a first determination value, and stops the calculation of the second value when at least one of a magnitude that is smaller than a second determination value and a magnitude that is equal to or larger than a third determination value is detected.

According to this structure, the magnitude of vibration of the internal combustion engine is detected in the plurality of ignition cycles. The first value representing the median value of the detected magnitude and the second value representing the standard deviation are calculated. The third value corresponding to these first and second values is calculated. Thereby, the BGL providing the reference of the magnitude of vibration can be obtained. The fourth value corresponding to the magnitude and the third value is calculated. For example, the fourth value is calculated by dividing the magnitude by the third value. Thereby, the fourth value representing the relative magnitude between the detected vibration magnitude and the reference of the vibration magnitude can be obtained. The ignition timing of the internal combustion engine is controlled according to a result of the comparison between the fourth value and the first determination value. For example, when the fourth value is larger than the first determination value, the probability that the knocking occurred is high. Therefore, the ignition timing is retarded.

For example, when the load of the internal combustion engine suddenly changes, sudden changes necessarily occur in detected magnitude regardless of presence and absence of the knocking. In this case, the standard deviation of the magnitude may suddenly increase. The fourth value is calculated corresponding to the second value representing the standard deviation. Therefore, when the standard deviation increases, the fourth value may increase even if the knocking has not occurred. This may cause erroneous retarding of the ignition timing. Accordingly, the calculation of the second value representing the standard deviation is stopped at least when a detected magnitude is smaller than the second determination value or when a detected magnitude is equal to or larger than the third determination value, i.e., when the load of the internal combustion engine suddenly changes. Thereby, sudden increase of the fourth value is prevented when the load of the internal combustion engine suddenly changes. Therefore, it is possible to reduce the frequency of the erroneous retarding of the ignition timing. Consequently, the ignition timing can be controlled precisely.

Preferably, the control unit stops calculation of the first value when at least one of the magnitude that is smaller than the second determination value and the magnitude that is equal to or larger than the third determination value is detected.

According to this structure, the calculation of the first value representing the median value stops at least when the detected magnitude is smaller than the second determination value, or when the detected magnitude is equal to or larger than the third determination value. Thereby, such a situation can be prevented that the fourth value calculated according to the first value suddenly increases or decreases when the load of the internal combustion engine suddenly changes.

Further preferably, the control unit calculates the first value by updating the first value by an update amount corresponding to the magnitude, resumes the updating of the first value when magnitudes smaller than the second determination value are continuously detected in a plurality of ignition cycles, and reduces the update amount of the first value when the magnitudes smaller than the second determination value are continuously detected in the plurality of ignition cycles.

According to this structure, the first value is calculated by updating it by the update amount corresponding to the magnitude. When the magnitudes smaller than the second determination value are continuously detected in the plurality of ignition cycles, the updating of the first value is resumed, and the update amount of the first value is reduced. Thereby, the first value representing the median value of the magnitude can follow the magnitude actually attained in the internal combustion engine, and excessive reduction of the first value can be prevented.

Further preferably, the control unit calculates the first value by updating the first value by an update amount corresponding to the magnitude, resumes the updating of the first value when magnitudes equal to or larger than the third determination value are continuously detected in a plurality of ignition cycles, and increases the update amount of the first value when the magnitudes equal to or larger than the third determination value are continuously detected in the plurality of ignition cycles.

According to this structure, the first value is calculated by updating it by the update amount corresponding to the magnitude. When magnitudes equal to or larger than the third determination value are continuously detected in the plurality of ignition cycles, the updating of the first value is resumed and the update amount of the first value is increased. Thereby, the first value representing the median value of the magnitude can rapidly follow the magnitude actually attained in the internal combustion engine.

Further preferably, the control unit calculates the third value by subtracting a product of a first coefficient larger than zero and the second value from the first value, and calculates the fourth value by dividing the magnitude by the third value. The second determination value is obtained by subtracting a product of a second coefficient larger than zero and the second value from the first value. The third determination value is obtained by adding a product of a third coefficient larger than zero and the second value to the first value.

According to the above structure, the third value can be calculated by subtracting the product of the first coefficient larger than zero and the second value from the first value. The fourth value can be calculated by dividing the magnitude by the third value. The second determination value is obtained by subtracting the product of the second coefficient larger than zero and the second value from the first value. The third determination value is obtained by adding the product of the third coefficient larger than zero and the second value to the first value. Thereby, it is possible to obtain the second and third determination values corresponding to the magnitude of vibration that is actually detected in the internal combustion engine. The detected magnitude is compared with the second or third determination value. Therefore, it is possible to determine precisely whether the load of the internal combustion engine changed or not.

Further preferably, the control unit retards the ignition timing when the fourth value is larger than the first determination value, counts a frequency of detecting the magnitude equal to or larger than a fourth determination value, corrects the first determination value to reduce the same when the frequency of detecting the magnitude equal to or larger than the fourth determination value is larger than a predetermined frequency, and stops the counting of the frequency in at least one of a case when magnitudes smaller than the second determination value are continuously detected in a plurality of ignition cycles and a case when magnitudes equal to or larger than the third determination value are continuously detected in a plurality of ignition cycles.

According to this structure, the ignition timing is retarded when the fourth value is larger than the first determination value. Thereby, when the detected magnitude is large, i.e., when the knocking occurred, the ignition timing can be retarded. Therefore, the frequency of occurring the knocking can be reduced. The frequency of detecting the magnitude equal to or larger than the fourth determination value is counted. When the frequency of detecting the magnitude equal to or larger than the fourth determination value is larger than the predetermined frequency, the first determination value is corrected and reduced. This facilitates retarding of the ignition timing. Therefore, the number of times that the knocking occurs can be further reduced. When the load of the internal combustion engine suddenly changes, the magnitude necessarily changes significantly. In this case, the frequency of detecting the magnitude equal to or larger than the fourth determination value may be counted erroneously. Accordingly, the counting of the frequency is stopped at least when magnitudes smaller than the second determination value are continuously detected in the plurality of ignition cycles, or when magnitudes equal to or larger than the third determination value are continuously detected in the plurality of ignition cycles. Thereby, it is possible to prevent erroneous counting of the frequency of detecting the magnitude equal to or larger than the fourth determination value, i.e., the frequency of occurrence of the knocking.

More preferably, the control unit reduces the counted frequency when the magnitudes equal to or larger than the third determination value are continuously detected in the plurality of ignition cycles.

According to this structure, when the magnitude equal to or larger than the third determination value is continuously detected in the plurality of ignition cycles, the counted frequency decreases. Thereby, the erroneously counted frequency can be corrected. Therefore, it is possible to count precisely the frequency of detecting the magnitude equal to or larger than the fourth determination value, i.e., the frequency of occurrence of the knocking.

Further preferably, the control unit calculates the third value by subtracting a product of a first coefficient larger than zero and the second value from the first value, and calculates the fourth value by dividing the magnitude by the third value. The second determination value is obtained by subtracting a product of a second coefficient larger than zero and the second value from the first value. The third determination value is obtained by adding a product of a third coefficient larger than the second coefficient and the second value to the first value. The fourth determination value is obtained by adding a product of a fourth coefficient larger than the third coefficient and the second value to the first value.

According to this structure, the third value can be calculated by subtracting the product of the first coefficient larger than zero and the second value from the first value. The fourth value can be calculated by dividing the magnitude by the third value. The second determination value is obtained by subtracting the product of the second coefficient larger than zero and the second value from the first value. The third determination value is obtained by adding the product of the third coefficient larger than the second coefficient and the second value to the first value. Thereby, it is possible to obtain the second, third and fourth determination values corresponding to the magnitude of vibration that is actually detected in the internal combustion engine. Accordingly, it is possible to determine precisely whether the load of the internal combustion engine changed or not. The fourth determination value is obtained by adding the product of the fourth coefficient larger than the third coefficient and the second value to the first value. Thereby, it is possible to obtain the fourth value corresponding to the magnitude of vibration that is actually detected in the internal combustion engine. The frequency of the detection of the magnitude that is equal to or larger than the fourth determination value is counted. Accordingly, it is possible to count precisely the frequency of occurrence of the knocking. The third coefficient is smaller than the fourth coefficient. In this case, the third determination value is smaller than the fourth determination value. The second coefficient is smaller than the third coefficient. Thus, the difference between the second determination value and the median value is smaller than the difference between the third determination value and the median value. This facilitates stopping, e.g., of calculation of the second value representing the standard deviation and the first value representing the median value.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a structure of an engine.

DESCRIPTION OF THE PREFERRED EMBODIMENTS

Figure 2:
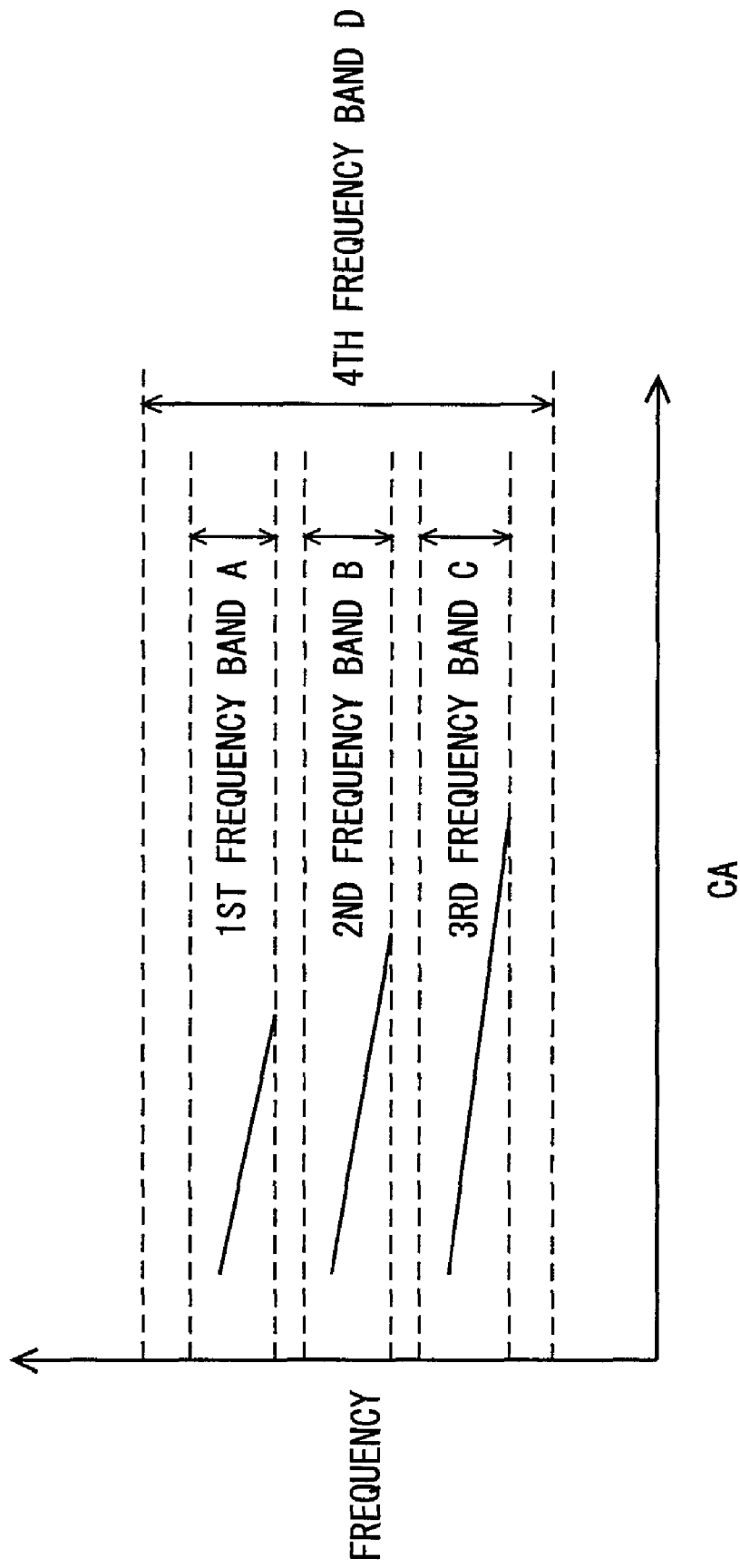
FIG. 2 shows frequency bands of vibrations occurring in the engine at the time of knocking.

An embodiment of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control apparatus according to the embodiment of the present invention will be described. Engine 100 is provided with a plurality of cylinders. The ignition timing control apparatus according to this embodiment is accomplished by a program executed by an engine ECU (Electronic Control Unit) 200, for example. The program executed by engine ECU 200 may be recorded on such a recording medium as CD (Compact Disc) or DVD (Digital Versatile Disc) to be distributed on the market.

Engine 100 is an internal combustion engine in which an air-fuel mixture of air suctioned from an air cleaner 102 and fuel injected from an injector 104 is ignited by a spark plug 106 and burnt in a combustion chamber.

The ignition timing is set according to an operation state of engine 100. In the following description, the ignition timing that is set according to the operation state of engine 100 may also be referred to as basic ignition timing. For example, when knocking occurs, the ignition timing is retarded from the basic ignition timing.

When the air-fuel mixture is burnt, a piston 108 is pushed down by the combustion pressure and a crankshaft 110 is rotated. The air-fuel mixture after combustion (exhaust gas) is cleaned by three-way catalysts 112 and thereafter exhausted to the outside of the vehicle. The quantity of air suctioned into engine 100 is regulated by a throttle valve 114. When an intake value 116 opens, the air-fuel mixture is take into the combustion chamber. When an exhaust value 118 opens, the exhaust gas is discharged from the combustion chamber.

Engine 100 is controlled by engine ECU 200. Connected to engine ECU 200 are a knock sensor 300, a water temperature sensor 302, a crank position sensor 306 provided to face a timing rotor 304, a throttle opening position sensor 308, a vehicle speed sensor 310, an ignition switch 312, and an air flow meter 314.

Knock sensor 300 is provided to a cylinder block of engine 100. Knock sensor 300 has a piezoelectric element. Knock sensor 300 generates a voltage in response to vibration of engine 100. The magnitude of the voltage corresponds to the magnitude of vibration. Knock sensor 300 sends a signal representing the voltage to engine ECU 200. Water temperature sensor 302 detects the temperature of a coolant in a water jacket of engine 100 and sends a signal representing the detection result to engine ECU 200.

Timing rotor 304 is provided to crankshaft 110 and rotates together with crankshaft 110. On the outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, the magnetic flux passing through a coil portion of crank position sensor 306 increases/decreases to generate an electromotive force in the coil portion. Crank position sensor 306 sends a signal representing the electromotive force to engine ECU 200. Engine ECU 200 detects the crank angle and the number of revolutions of crankshaft 110 based on the signal sent from crank position sensor 306.

Throttle opening position sensor 308 detects a throttle opening position and sends a signal representing the detection result to engine ECU 200. Vehicle speed sensor 310 detects the number of revolutions of a wheel (not shown) and sends a signal representing the detection result to engine ECU 200. Engine ECU 200 calculates the vehicle speed based on the number of revolutions of the wheel. Ignition switch 312 is turned on by a driver when engine 100 is to be started. Air flow meter 314 detects the quantity of intake air into engine 100 and sends a signal representing the detection result to engine ECU 200.

Engine ECU 200 is operated by electric power supplied from an auxiliary battery 320 that is a power supply. Engine ECU 200 performs operation processes based on signals sent from respective sensors and ignition switch 312 as well as a map and a program stored in a ROM (Read-Only Memory) 202, and controls relevant devices so as to allow engine 100 to operate in a desired state.

In the present embodiment, engine ECU 200 detects a waveform of vibration (hereafter referred to as "vibration waveform") of engine 100 in a predetermined knock detection gate (a section from a predetermined first crank angle to a predetermined second crank angle), based on the signal sent from knock sensor 300 and the crank angle, and determines whether or not knocking has occurred in engine 100 or not, based on the detected vibration waveform. The knock detection gate in the present embodiment is the section from the top dead center (0°) to 90° in a combustion stroke. The knock detection gate is not limited to this.

When knocking occurs, vibration at a frequency included in frequency bands A-C is generated in engine 100 as shown in FIG. 2. Accordingly, in the present embodiment, vibration is detected in a broader frequency band D including the first to third frequency bands A to C.

Figure 3:
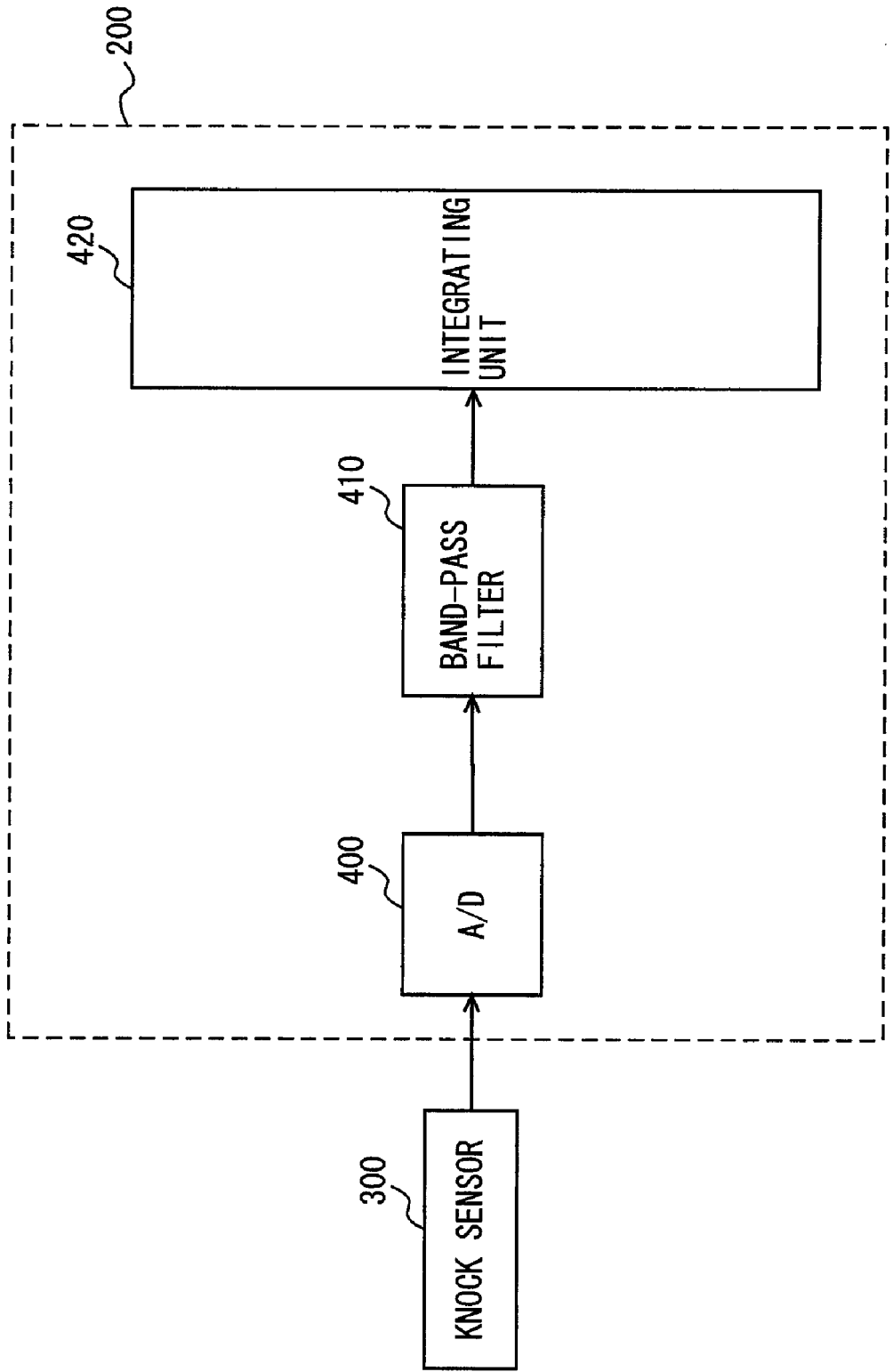
FIG. 3 is a control block diagram showing an engine ECU.

As shown in FIG. 3, engine ECU 200 includes an A/D (analog/digital) converter 400, a band-pass filter 410 and an integrating unit 420.

Analog/digital converter 400 converts analog signals into digital signals. Band-pass filter 410 passes only the signal in frequency band D out of the signals transmitted from knock sensor 300. In other words, band-pass filter 410 extracts only the vibration in frequency band D out of the vibrations detected by knock sensor 300.

Figure 4:
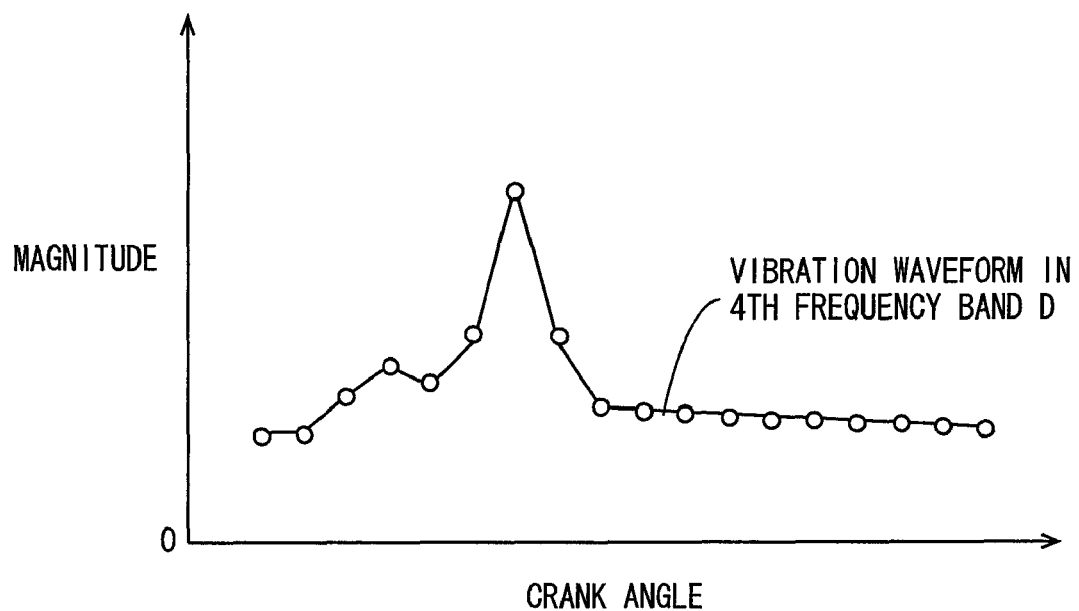
FIG. 4 shows a vibration waveform of the engine.

Integrating unit 420 calculates an integrated value by integrating the signal selected by band-pass filter 410, namely integrating the magnitudes of vibration for every crank angle range of 5° (hereinafter also referred to as 5° integrated value). Thereby, the vibration waveform of frequency band D is detected as shown in FIG. 4.

Figure 5:
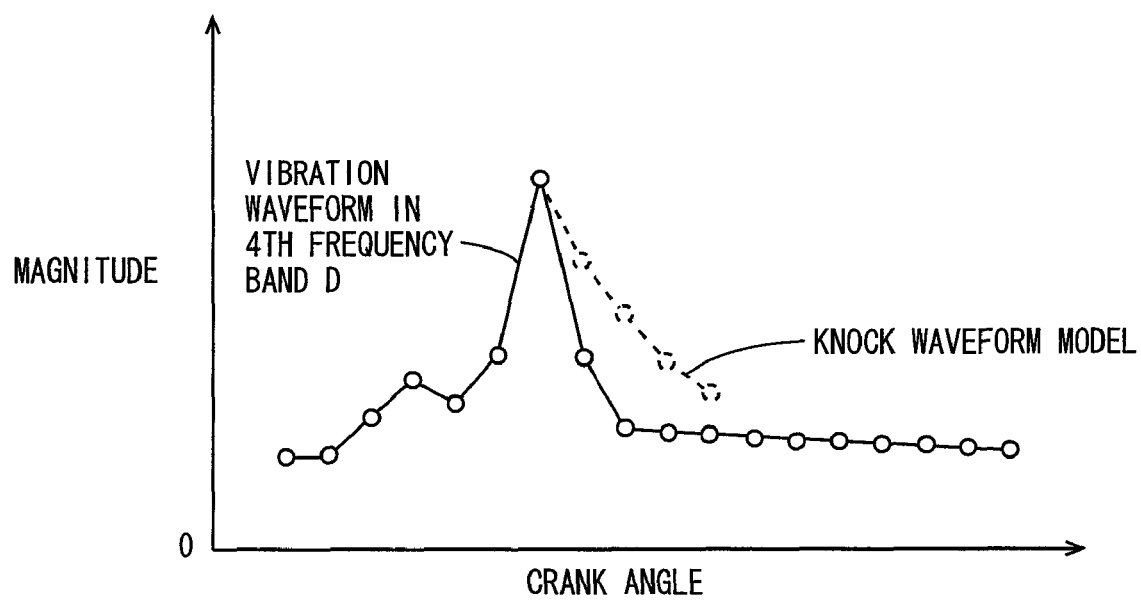
FIG. 5 shows the vibration waveform and a knock waveform model for comparison.

The detected vibration waveform is used for calculating a correlation coefficient K that represents the degree of similarity of the vibration waveform to the knock waveform model (i.e., represents a difference in form between the vibration waveform and the knock waveform model). Correlation coefficient K is calculated by comparing the knock waveform model with the vibration waveform detected in a range of a crank angle higher than a crank angle at which the magnitude reaches a peak, i.e., a crank angle that exhibits a larger magnitude than those at neighboring crank angles and is the largest among such larger magnitudes, as shown in FIG. 5.

The knock waveform model is defined as a reference vibration waveform of engine 100 for the case where the knocking occurs. In the present embodiment, the magnitude of the knock waveform model is set every time the comparison with the vibration waveform is performed. More specifically, the magnitude of the knock waveform mode is set such that the maximum value thereof may be equal to the magnitude (a peak value of the magnitude) larger than the neighbor magnitudes on the vibration waveform.

The magnitudes other than the maximum magnitude are set according to engine speed NE and the load of engine 100. More specifically, the damping rate of the magnitude at a crank angle relative to the magnitude at the adjacent crank angle is set according to a map using engine speed NE and the load of engine 100 as parameters.

Figure 6:
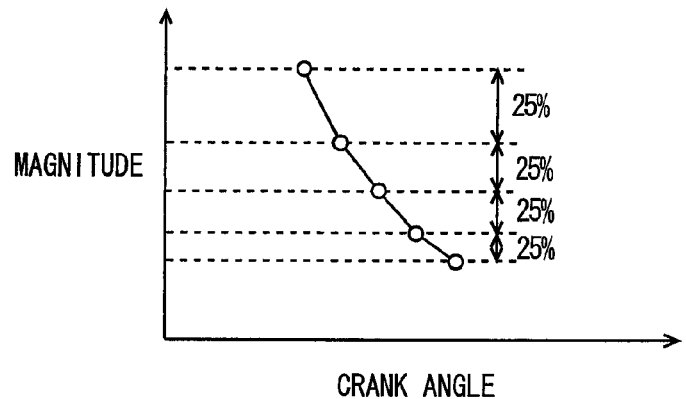
FIG. 6 shows a knock waveform model.

For example, when the damping rate is 25% and the magnitudes in a range of crank angle of 20° are set, the magnitude decreases 25% per unit crank angle as shown in FIG. 6. Here, the method of setting the magnitude on the knock waveform model is not limited to the above-described one.

The absolute value of the difference (amount of deviation) between the magnitude on the vibration waveform and the magnitude on the knock waveform model is calculated for every crank angle (every 5°) to thereby calculate correlation coefficient K. The absolute value of the difference between the magnitude on the vibration waveform and the magnitude on the knock waveform model for every crank angle other than 5° may be calculated instead.

Figure 7:
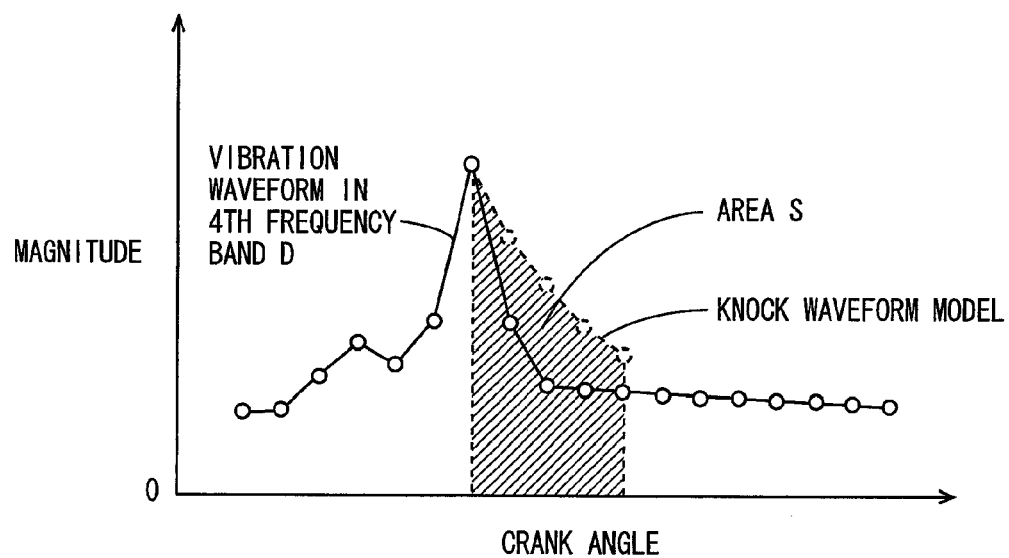
FIG. 7 shows an area S of the knock waveform model.

It is supposed here that the absolute value of the difference between the magnitude on the vibration waveform and the magnitude on the knock waveform model for each crank angle is $\Delta S(I)$ (I is a natural number). As shown by the oblique lines in FIG. 7, it is supposed that the sum of the magnitudes of vibrations on the knock waveform model, namely the area of the knock waveform model, is S. Correlation coefficient K is calculated using equation (1) below:

$$K = (S - \Sigma \Delta S(I))/S \qquad (1)$$

where $\Sigma \Delta S (I)$ is the total of $\Delta S (I)$. The method of calculating the correlation coefficient is not limited to the above-described one.

Figure 8:
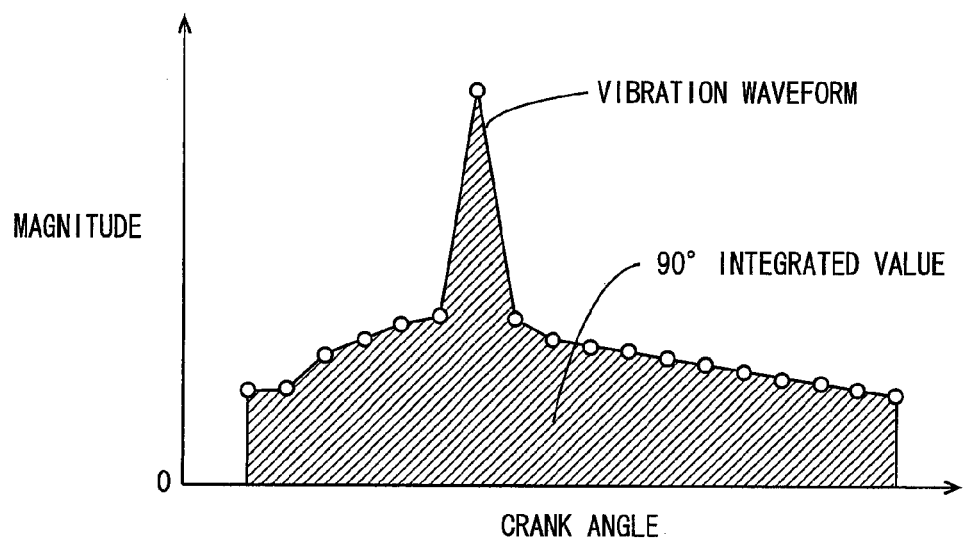
FIG. 8 shows a 90° integrated value lpkknk.

In the present embodiment, knock magnitude N is calculated in addition to correlation coefficient K. As indicated by hatching in FIG. 8, knock magnitude N is calculated, using 90° integrated value lpkknk obtained by summing the magnitudes (5° integrated values) on the vibration waveform. Instead of 90° integrated value lpkknk, the maximum magnitude on the vibration waveform may be used.

A value representing the magnitude of vibration of engine 100 in the state where knocking does not occur in engine 100 is BGL (Back Ground Level). Knock magnitude N is calculated using the following equation (2).

$$N = lpkknk/BGL \qquad (2)$$

The method of calculating knock magnitude N is not limited to the above-described one. A logarithmically transformed value of 90° integrated value lpkknk is used for calculating knock magnitude N. BGL is calculated as a value obtained by subtracting a product of a standard deviation σ and a positive coefficient (e.g., of 1) from a median value VM on a frequency distribution that represents a frequency (also may be represented as the number of times or probability) of detection of 90° integrated value lpkknk. The method of calculating the BGL is not limited to the above, and the BGL may be stored in ROM 202. For producing the frequency distribution, the logarithmically transformed value of 90° integrated value lpkknk is used.

In the present embodiment, the determination whether the knocking occurred or not is performed in response to every ignition, using correlation coefficient K calculated based on the shape of the vibration waveform and knock magnitude N calculated based on the magnitude of vibration waveform. Whether the knocking occurred or not is determined for each cylinder. When correlation coefficient K is equal to or larger than a threshold value K(1), and knock magnitude N is equal to or larger than a determination value VJ, it is determined that the knocking occurred. Otherwise, it is determined that the knocking has not occurred.

When it is determined that the knocking has occurred, the ignition timing is retarded by a predetermined amount. When it is determined that the knocking has not occurred, the ignition timing is advanced by a predetermined amount.

At the time of shipment of engine 100 or the vehicle, ROM 202 has stored determination value VJ of an initial value that is determined in advance by an experiment or the like. However, when variations in output value of knock sensor 300 or deterioration thereof may change the detected magnitude even when the same vibrations occur in engine 100. In this case, it is necessary to correct determination value VJ and to determine whether the knocking occurred or not, using determination value VJ corresponding to the actually detected magnitude. In the present embodiment, therefore, determination value VJ is corrected in response to every predetermined ignition cycles such as every 200 ignition cycles.

Figure 9:
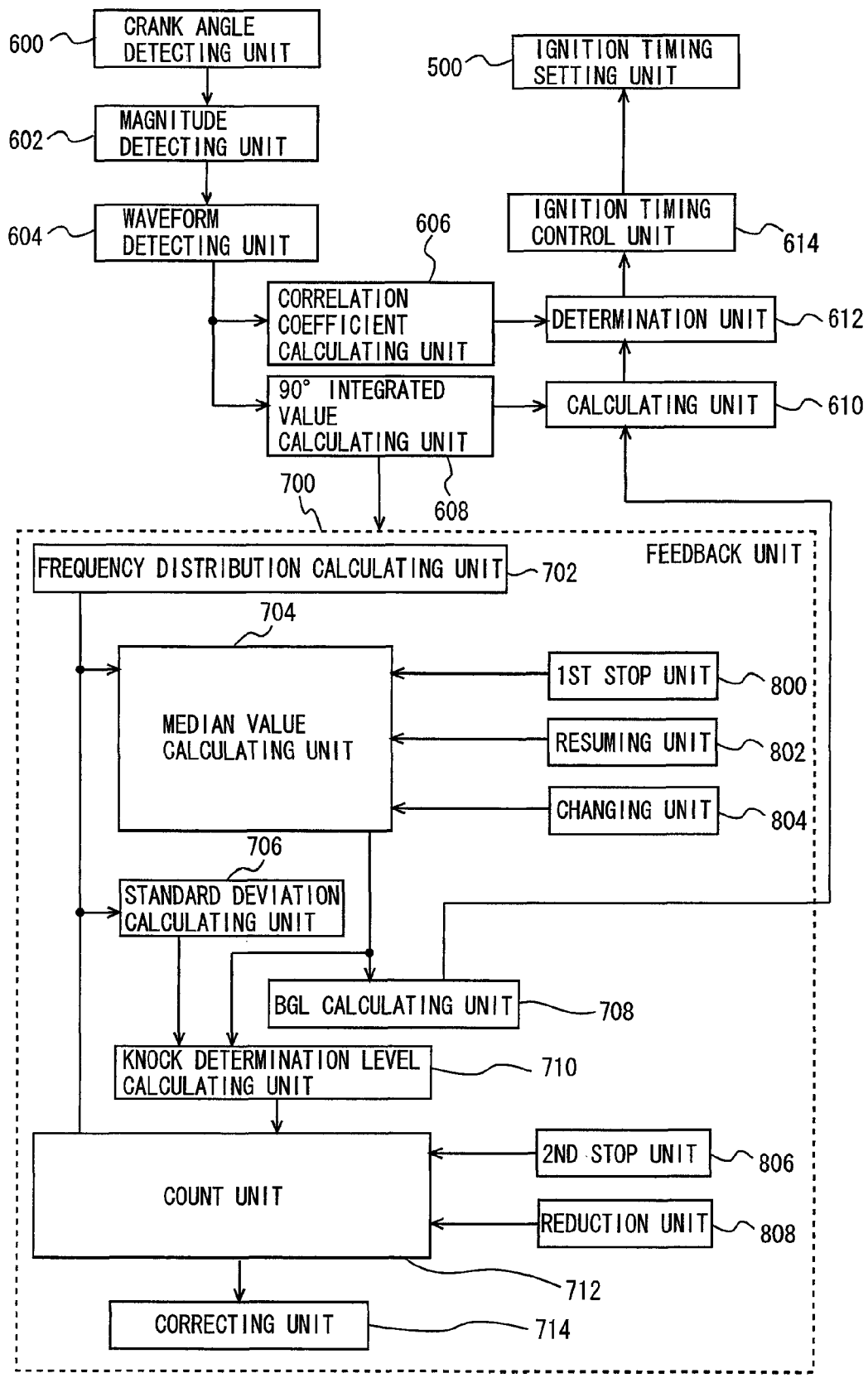
FIG. 9 is a functional block diagram of the engine ECU.

Referring to FIG. 9, a function of engine ECU 200 will be described below. The functions described below may be implemented by software or hardware.

Engine ECU 200 includes an ignition timing setting unit 500, a crank angle detecting unit 600, a magnitude detecting unit 602, a waveform detecting unit 604, a correlation coefficient calculating unit 606, a 90° integrated value calculating unit 608, a calculating unit 610, a determination unit 612, an ignition timing control unit 614 and a feedback unit 700.

Figure 10:
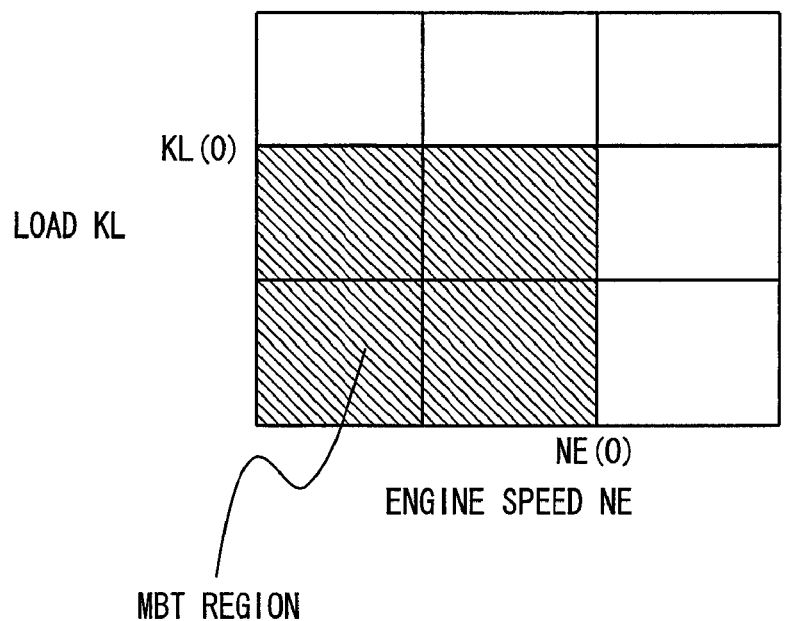
FIG. 10 is a map determining basic ignition timing.

Ignition timing setting unit 500 sets basic ignition timing according to an operation state of engine 100. As shown in FIG. 10, the basic ignition timing is set according to a map having engine speed NE and a load KL.

In the present embodiment, an MBT (Minimum advance for Best Torque) is set as the basic ignition timing when the operation is in a state (region) where engine speed NE is smaller than a threshold value NE(0) and load KL is smaller than a threshold value KL(0). This is because the knocking hardly occurs in the operation state where engine speed NE is smaller than threshold value NE(0) and load KL is smaller than threshold value KL(0). The MBT indicates the ignition timing that maximizes the output of engine 100.

Load KL is calculated based on the amount of intake air detected by an air flow meter 314, engine speed NE and others. The method of calculating load KL can be implemented by a well-known technique, and therefore description thereof is not repeated.

Crank angle detecting unit 600 detects a crank angle based on a signal transmitted from crank position sensor 306.

Magnitude detecting unit 602 detects the magnitude of vibration at the knock detection gate based on the signal transmitted from knock sensor 300. The magnitude of vibration is detected corresponding to the crank angle. The magnitude of vibration is represented by the output voltage value of knock sensor 300. The magnitude of vibration may be represented by a value corresponding to the output voltage of knock sensor 300.

Waveform detecting unit 604 detects the vibration waveform at the knock detection gate by integrating the magnitude of vibration for every 5°.

Correlation coefficient calculating unit 606 calculates correlation coefficient K that represents the degree of similarity of the vibration waveform to the knock waveform model (i.e., represents the difference in form between the vibration waveform and the knock waveform model).

90° integrated value calculating unit 608 calculates 90° integrated value lpkknk obtained by integrating the magnitude (5° integrated value) on the vibration waveform.

Calculating unit 610 calculates knock magnitude N, using 90° integrated value lpkknk. Determination unit 612 determines in response to every ignition whether knocking occurred or not, using correlation coefficient K and knock magnitude N. When correlation coefficient K is equal to or larger than threshold value K(1) and knock magnitude N is equal to or larger than determination value VJ, determination unit 612 determines that the knocking occurred. Otherwise, it determines that the knocking has not occurred.

Ignition timing control unit 614 controls the correction of the ignition timing according to whether the knocking occurred or not. When it is determined that the knocking occurred, the ignition timing is retarded by a predetermined amount. When it is determined that the knocking has not occurred, the ignition timing is advanced by a predetermined amount. The ignition timing is advanced and retarded within a range from the MBT to the retarded angle limit value. Thus, the ignition timing advanced to the maximum extent corresponds to the MBT. The ignition timing retarded to the maximum extent corresponds to the retarded angle limit value.

Feedback unit 700 sets determination value VJ to be compared with knock magnitude N. As shown in FIG. 9, feedback unit 700 includes a frequency distribution producing unit 702, a median value calculating unit 704, a standard deviation calculating unit 706, a BGL calculating unit 708, a knock determination level calculating unit 710, a count unit 712 and a correcting unit 714. Further, feedback unit 700 includes a first stop unit 800, a resuming unit 802, a changing unit 804, a second stop unit 806 and a reduction unit 808.

Frequency distribution producing unit 702 produces the frequency distribution of 90° integrated value lpkknk calculated in each ignition cycle. For producing the frequency distribution, the logarithmically transformed value of 90° integrated value lpkknk is used.

Median value calculating unit 704 calculates median value VM of 90° integrated value. Median value VM is calculated for every ignition cycle according to the following equation (3).

$$VM(i)=VM(i-1)+(lpkknk-VM(i-1))/X \qquad (3)$$

In equation (3), VM(i) represents a current value. VM(i−1) represents a last value. X is a positive value. Thus, median value VM is calculated by updating it by an update amount "(lpkknk−VM(i−1))/X" that is determined according to 90° integrated value lpkknk. As X decreases, the update amount of median value VM increases.

Median value VM calculated according to equation (3) is an approximate value representing the median value calculated based on multiple 90° integrated values lpkknk (e.g., corresponding to 200 ignition cycles). Therefore, median value VM calculated according to equation (3) may be different from the actual median value.

Standard deviation calculating unit 706 calculates a standard deviation σ of 90° integrated value lpkknk. Standard deviation σ is calculated for every ignition cycle according to the following equation (4).

$$\sigma(i)=\sigma(i-1)+(lpkknk-\sigma(i-1))/Y \quad (4)$$

In equation (4), σ(i) represents a current value. σ(i−1) represents a last value. Y is a positive value. Thus, standard deviation σ is calculated by updating it by an update amount "(lpkknk−σ(i−1))/Y" that is determined according to 90° integrated value lpkknk.

Standard deviation σ calculated according to equation (4) is an approximate value representing the standard deviation that is calculated based on a plurality of 90° integrated values lpkknk (e.g., for 200 ignition cycles). Therefore, the standard deviation σ calculated according to equation (4) is different from the actual standard deviation.

Instead of calculating median value VM and standard deviation σ according to equations (3) and (4), the following calculation method may be used.

When 90° integrated value lpkknk that is currently calculated is larger than last calculated median value VM, the value obtained by adding a predetermined value C(1) to last calculated median value VM is handled as currently calculated median value VM. Conversely, when currently calculated 90° integrated value lpkknk is smaller than last calculated median value VM, a value obtained by subtracting a predetermined value C(2) (e.g., equal to C(1)) from last calculated median value VM is handled as currently calculated median value VM.

When currently calculated 90° integrated value lpkknk is smaller than last calculated median value VM and is larger than a value obtained by subtracting last calculated standard deviation σ from last calculated median value VM, the value obtained by subtracting double a predetermined value C(3) from last calculated standard deviation σ is handled as currently calculated standard deviation σ. Conversely, when currently calculated 90° integrated value lpkknk is larger than last calculated median value VM, or is smaller than the value obtained by subtracting last calculated standard deviation σ from last calculated median value VM, a value obtained by adding predetermined value C(4) (e.g., equal to C(3)) to last calculated standard deviation σ is handled as currently calculated standard deviation σ. The initial values of median value VM and standard deviation σ may take predetermined values, respectively, and may also be equal to zero.

Figure 11:
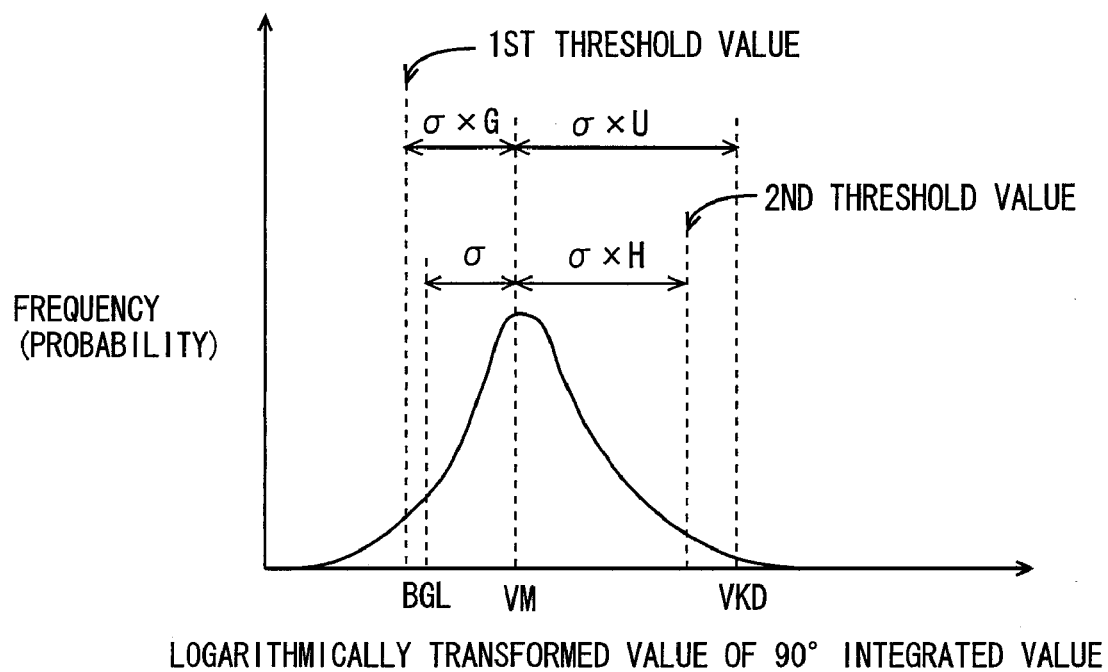
FIG. 11 is a (first) chart shows a frequency distribution of 90° integrated value lpkknk.

BGL calculating unit 708 calculates the BGL by subtracting median value VM from standard deviation σ as shown in FIG. 11. The BGL may be calculated by subtracting a product of standard deviation σ and a coefficient larger than zero from median value VM.

Knock determination level calculating unit 710 calculates (i.e., sets) a knock determination level VKD, using median value VM and standard deviation σ. As shown in FIG. 11, a value obtained by adding a product of a positive coefficient U (that is a constant, e.g., equal to 3) and standard deviation σ to median value VM is handled as knock determination level VKD. The method of calculating knock determination level VKD is not restricted to this.

Coefficient U is obtained from data or knowledge derived by an experiment or the like. 90° integrated value lpkknk larger than knock determination level VKD attained in the case of (U=3) is substantially equal to 90° integrated value lpkknk in the ignition cycle in which the knocking actually occurred. Coefficient U may take a value other than three.

Count unit 712 counts a frequency of 90° integrated value lpkknk equal to or larger than knock determination level VKD in a predetermined number of ignition cycles (e.g., 200 ignition cycles), and thereby obtains a knock count KC. Count unit 712 may count a rate of 90° integrated value lpkknk equal to or higher than knock determination level VKD.

Correcting unit 714 corrects determination value VJ to reduce it by a predetermined correction amount A(1) when knock count KC is equal to or larger than a threshold value KC(0). Also, correcting unit 714 corrects determination value VJ to increase it by a predetermined correction amount A(2) when knock count KC is smaller than threshold value KC(0).

First stop unit 800 stops updating of median value VM and standard deviation σ when 90° integrated value lpkknk is smaller than the first threshold value. Also, first stop unit 800 stops updating of median value VM and standard deviation σ when 90° integrated value lpkknk is equal to or larger than the second threshold value.

As shown in FIG. 11, the first threshold value is obtained by subtracting a product of standard deviation σ and a positive coefficient G from median value VM. The second threshold value is obtained by adding a product of standard deviation σ and a positive coefficient H to median value VM. Coefficient G is smaller than coefficient H. Coefficient H is smaller than coefficient U. Median value VM used for the first and second threshold values may be a current value or a last value.

In the present embodiment, an operation is performed for each cylinder to count the ignition cycles in which 90° integrated value lpkknk smaller than the first threshold value is continuously detected. Further, an operation is performed without discrimination between cylinders to count the ignition cycles in which 90° integrated value lpkknk smaller than the first threshold value is continuously detected.

Likewise, an operation is performed for each cylinder to count the ignition cycles in which 90° integrated value lpkknk equal to or larger than the second threshold value is continuously detected. Also, an operation is performed without discrimination between the cylinders to count the ignition cycles in which 90° integrated value lpkknk equal to or larger than the second threshold value is continuously detected.

Resuming unit 802 resumes the updating of median value VM when 90° integrated value lpkknk smaller than the first threshold value is continuously detected in the plurality of ignition cycles. Also, resuming unit 802 resumes the updating of median value VM when 90° integrated value lpkknk equal to or larger than the second threshold value is continuously detected in the plurality of ignition cycles.

More specifically, the updating of median value VM resumes when the number of ignition cycles in which 90° integrated value lpkknk smaller than the first threshold value is continuously detected in the independent cylinder becomes equal to or larger than the count of σ of a positive constant.

Likewise, the updating of median value VM resumes when the number of ignition cycles in which 90° integrated value lpkknk equal to or larger than the second threshold value is continuously detected in the independent cylinder becomes equal to or larger than the count of σ.

Further, the updating of median value VM resumes when the number of ignition cycles in which 90° integrated value lpkknk smaller than the first threshold value is continuously detected without discrimination between the cylinders becomes equal to or larger than the count of β of a positive constant.

Likewise, the updating of median value VM resumes when the number of ignition cycles in which 90° integrated value lpkknk equal to or larger than the second threshold value is continuously detected without discrimination between the cylinders becomes equal to or larger than the count of β.

Changing unit 804 reduces the update amount of median value VM when 90° integrated value lpkknk smaller than the first threshold value is continuously detected in a plurality of ignition cycles. Thus, changing unit 804 reduces the update amount of median value VM when the updating of median value VM is to be resumed because 90° integrated value lpkknk smaller than the first threshold value is continuously detected in the plurality of ignition cycles.

Changing unit 804 increases the update amount of median value VM when 90° integrated value lpkknk equal to or larger than the second threshold value is continuously detected in a plurality of ignition cycles. Thus, changing unit 804 increases the update amount of median value VM when the updating of median value VM is resumed because 90° integrated value lpkknk equal to or larger than the second threshold value is continuously detected in the plurality of ignition cycles.

Second stop unit 806 stops counting for knock count KC as well as counting of the ignition cycles when 90° integrated value lpkknk smaller than the first threshold value is continuously detected in a plurality of ignition cycles.

Further, second stop unit 806 stops counting for knock count KC as well as counting of the ignition cycles when 90° integrated value lpkknk equal to or larger than the second threshold value is continuously detected in a plurality of ignition cycles.

Reduction unit 808 reduces knock count KC when 90° integrated value lpkknk equal to or larger than the second threshold value is continuously detected in a plurality of ignition cycles. For example, when such a situation occurs in one of the plurality of cylinders that 90° integrated value lpkknk equal to or larger than the second threshold value is continuously detected in the ignition cycles of α or more in number, reduction unit 808 reduces knock count KC by "α−1". In the cylinders which are continuous with each other in the ignition order, when such a situation occurs that 90° integrated value lpkknk equal to or larger than the second threshold value is continuously detected in ignition cycles which are equal in number to β or more. In this case, reduction unit 808 reduces knock value KC by "β−1". The method of reducing knock count KC is not restricted to the above.

Figure 12:
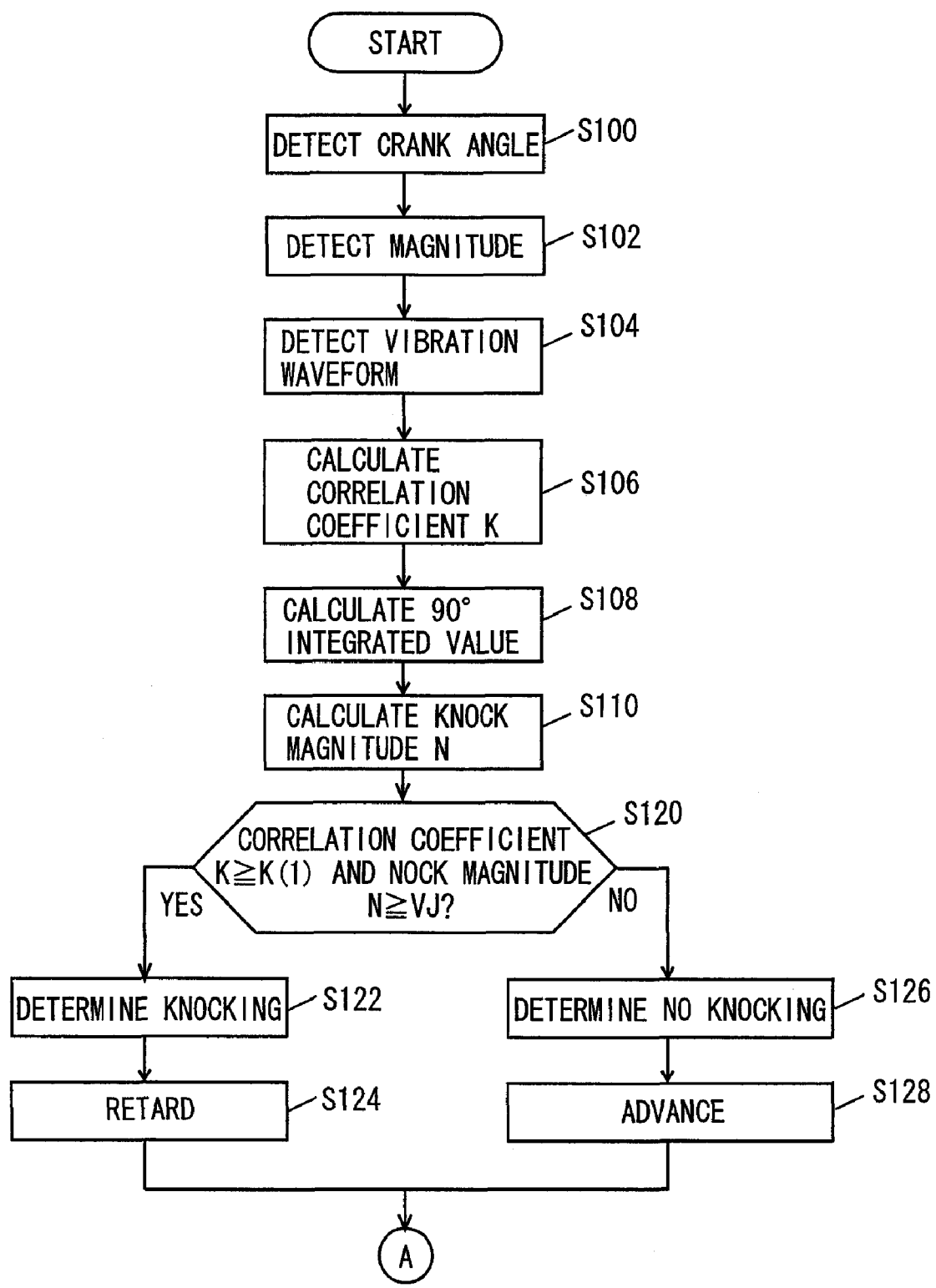
FIG. 12 is a (first) diagram showing a control structure of a program executed by the engine ECU.
Figure 13:
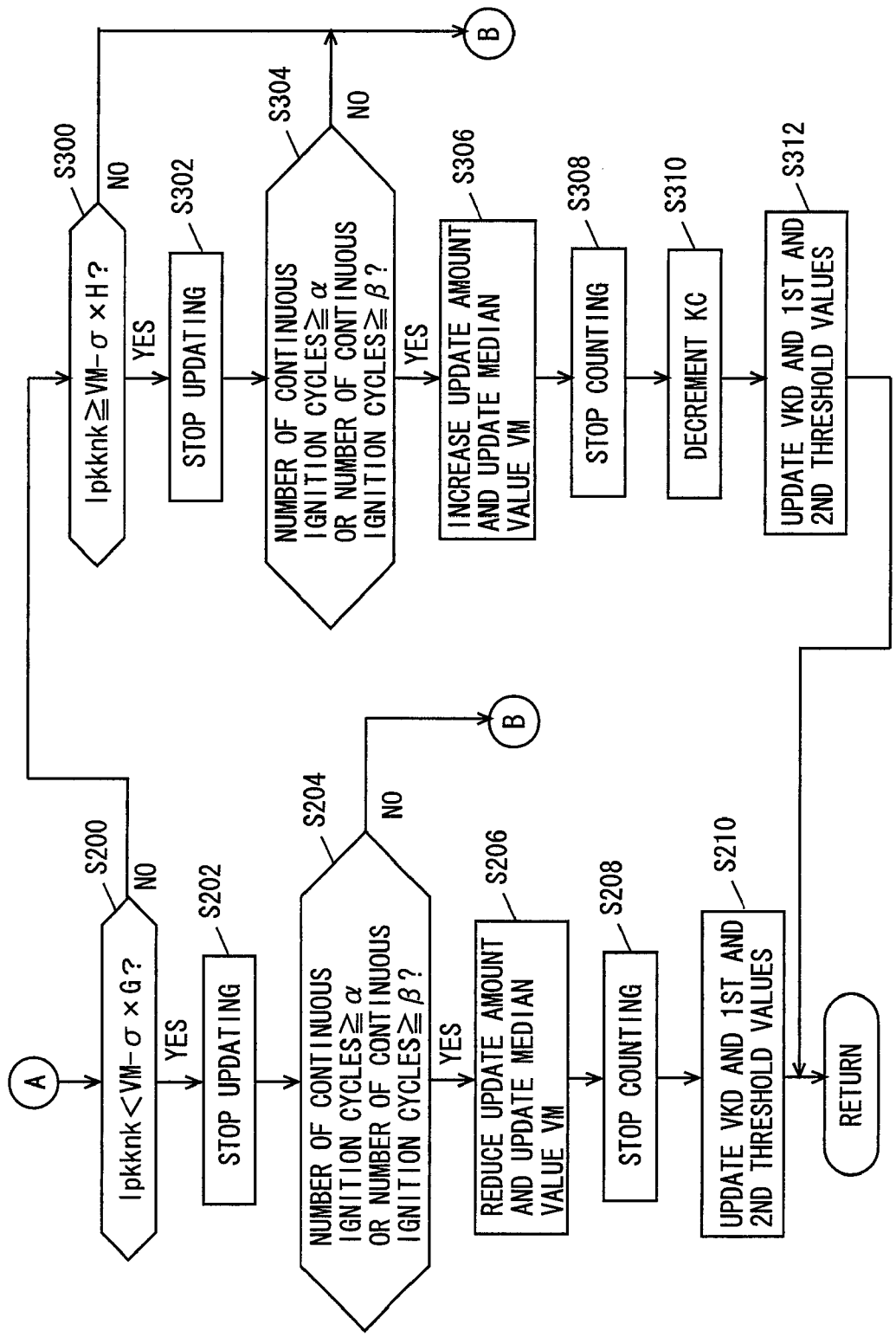
FIG. 13 is a (second) diagram showing the control structure of the program executed by the engine ECU.
Figure 14:
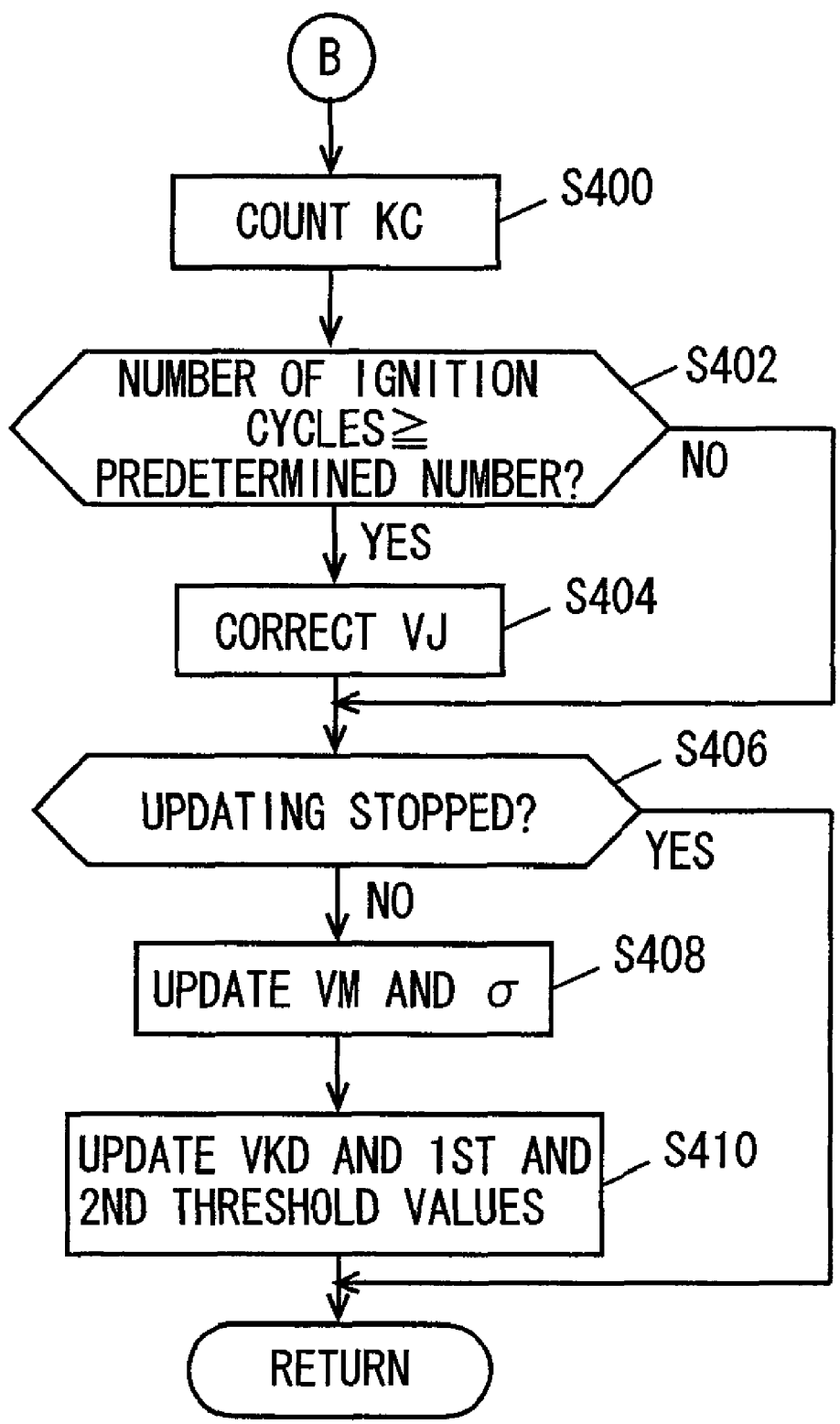
FIG. 14 is a (third) diagram showing the control structure of the program executed by the engine ECU.

Referring to FIGS. 12-14, the control structure of the program executed by engine ECU 200 will be described below.

In step (hereinafter "step" will be abbreviated as "S") 100, engine ECU 200 detects the crank angle based on a signal sent from crank position sensor 306. In S102, engine ECU 200 detects the magnitude of vibration of engine 100 corresponding to the crank angle based on the signal sent from knock sensor 300.

In S104, engine ECU 200 obtains the 5° integrated value by integrating the output voltage value (representing the magnitude of vibration) of knock sensor 300 for every 5° of the crank angle, and thereby detects the vibration waveform of engine 100.

In S106, engine ECU 200 calculates correlation coefficient K. In S108, engine ECU 200 calculates 90° integrated value. In S110, engine ECU 200 calculates knock magnitude N.

In S120, engine ECU 200 determines whether such a condition is satisfied or not that correlation coefficient K is equal to or larger than threshold value K(1) and knock magnitude N is equal to or larger than determination value VJ. When correlation coefficient K is equal to or larger than threshold value K(1) and knock magnitude N is equal to or larger than determination value VJ (YES in S120), the process proceeds to S122. Otherwise (NO in S120), the process proceeds to S126.

In S122, engine ECU 200 determines that engine 100 knocked. In S124, engine ECU 200 retards the ignition timing. In S126, engine ECU 200 determines that engine 100 has not knocked. In S128, engine ECU 200 advances the ignition timing.

Referring to FIG. 13, engine ECU 200 determines in S200 whether 90° integrated value lpkknk that is detected in the current ignition cycle is smaller than the first threshold value (VM−σ×G) or not. When 90° integrated value lpkknk is smaller than the first threshold value (YES in S200), the process proceeds to S202. Otherwise (NO in S200), the process proceeds to S300.

In S202, engine ECU 200 stops the updating of median value VM and standard deviation σ. In S204, engine ECU 200 performs the determination about the number of ignition cycles in which 90° integrated value lpkknk smaller than the first threshold value is continuously detected, and particularly performs the determination whether the above number counted in an independent cylinder is equal to or larger than σ or not, or whether the above number counted without discrimination between the cylinders is equal to or larger than β or not.

When the number counted in an independent cylinder is equal to α or more, or when the number counted without discrimination between the cylinders is β or more (YES in S204), the process proceeds to S206. Otherwise (NO in S204), the process proceeds to S400.

In S206, engine ECU 200 reduces the update amount of median value VM, and updates median value VM, using 90° integrated value lpkknk detected in the last ignition cycle. Thus, the updating of median value VM resumes.

In S208, engine ECU 200 stops the counting for knock count KC as well as the counting of ignition cycles.

In S210, engine ECU 200 updates (i.e., sets) knock determination level VKD as well as the first and second threshold values, using the currently calculated (i.e., the latest) median value VM.

In S300, engine ECU 200 determines whether 90° integrated value lpkknk that is detected in the current ignition cycle is equal to or larger than the second threshold value (VM+σ×H) or not. When 90° integrated value lpkknk is equal to or larger than the second threshold value (YES in S300), the process proceeds to S302. Otherwise (NO in S300), the process proceeds to S400.

In S302, engine ECU 200 stops the updating of median value VM and standard deviation σ. In S304, engine ECU 200 performs the determination about the number of ignition cycles in which 90° integrated value lpkknk equal to or larger than the second threshold value is continuously detected, and particularly performs the determination whether the above number counted in an independent cylinder is equal to or larger than σ or not, or whether the above number counted without discrimination between the cylinders is equal to or larger than β or not.

When the number counted in an independent cylinder is equal to α or more, or when the number counted without discrimination between the cylinders is β or more (YES in S304), the process proceeds to S306. Otherwise, (NO in S304), the process proceeds to S400.

In S306, engine ECU 200 increases the update amount of median value VM, and updates median value VM, using 90° integrated value lpkknk detected in the current ignition cycle. Thus, the updating of median value VM resumes.

In S308, engine ECU 200 stops the counting for knock count KC and the counting of ignition cycles. In S310, engine ECU 200 reduces knock count KC.

In S312, engine ECU 200 updates (i.e., sets) knock determination level VKD as well as the first and second threshold values, using the currently calculated (i.e., the latest) median value VM.

In S400, engine ECU 200 obtains knock count KC. In S402, engine ECU 200 determines whether the number of ignition cycles after the last correction of determination value VJ is equal to or larger than the predetermined number or more. When the number of ignition cycles after the last correction of determination value VJ is equal to or larger than the predetermined number (YES in S402), the process proceeds to S404. Otherwise NO in S402), the process proceeds to S406.

In S404, engine ECU 200 corrects determination value VJ according to knock count KC. When knock count KC is equal to or larger than threshold value KC(0), determination value VJ is corrected and reduced by a predetermined correction amount A(1). When knock count KC is smaller than threshold value KC(0), determination value VJ is corrected and increased by predetermined correction amount A(1).

In S406, engine ECU 200 determines whether the updating of median value VM and standard deviation σ has stopped or not. When the updating has stopped (YES in S406), the process returns to S100. Otherwise (NO in S406), the process proceeds to S408.

In S408, engine ECU 200 updates median value VM and standard deviation σ, using 90° integrated value lpkknk that was detected in the last ignition cycle. In S410, engine ECU 200 updates (i.e., sets) knock determination level VKD as well as the first and second threshold values, using the last calculated median value VM and standard deviation σ.

The order of processing in S100-S410 is not restricted to that shown in FIGS. 12-14. The processing in S100-S410 may be executed in the order different from that shown in FIGS. 12-14.

Based on the structure and flowcharts described above, engine ECU 200 of the present embodiment operates as described below.

During the operation of engine 100, the crank angle is detected based on a signal sent from crank position sensor 306 (S100). Based on the signal sent from knock sensor 300, the magnitude of vibration of engine 100 is detected corresponding to the crank angle (S102). The 5° integrated value is calculated by integrating the output voltage value of knock sensor 300 for every 5° of crank angle, and thereby the vibration waveform of engine 100 is detected (S104).

For determining whether the knocking occurred or not, based on the shape of the waveform, correlation coefficient K is calculated using the knock waveform mode (S106). Further, 90° integrated value lpkknk is calculated (S108) for determining whether the vibration waveform contains the vibration caused by the knocking or not. 90° integrated value lpkknk is divided by the BGL to calculate knock magnitude N (S110).

When knock magnitude N is larger than a minimum guard value (NO in S112), it is determined whether the knocking occurred or not. When correlation coefficient K is equal to or larger than threshold value K(1) and knock magnitude N is equal to or larger than determination value VJ (YES in S120), it can be considered that the shape of the detected waveform is similar to that of the waveform of the knocking and the magnitude of the vibration is large. Thus, it can be considered that the probability of occurrence of the knocking is very high. In this case, it is determined that engine 100 knocked (S122). For suppressing the knocking, the ignition timing is retarded (S124).

Conversely, when correlation coefficient K is smaller than threshold value K(1), or when knock magnitude N is smaller than determination value VJ, it is determined that engine 100 has not knocked (S126). In this case, the ignition timing is advanced (S128).

At the time of shipment of engine 100 or the vehicle, ROM 202 has stored determination value VJ of which value (i.e., an initial value of determination value VJ at the time of shipment) is determined in advance by an experiment or the like. However, when variations in output value of knock sensor 300 or deterioration thereof may change the detected magnitude even when the same vibration occurs in engine 100. In this case, it is necessary to correct determination value VJ and to determine whether the knocking occurred or not, using determination value VJ corresponding to the actually detected magnitude.

In the present embodiment, therefore, determination value VJ is corrected using the frequency distribution of 90° integrated value lpkknk. When 90° integrated value lpkknk that is detected in the current ignition cycle is equal to or larger than the first threshold value (NO in S200), and is smaller than the second value (NO in S300), knock count KC is obtained for correcting determination value VJ (S400).

When the number of the ignition cycles after the last correction of determination value VJ is smaller than the predetermined number (NO in S402), and the updating of median value VM and standard deviation σ has not stopped (NO in S406), median value VM and standard deviation σ are updated (S408). Further, knock determination level VKD as well as the first and second threshold values are updated, using median value VM and standard deviation σ that were calculated last (S408).

When the number of ignition cycles after the last correction of determination value VJ is equal to or larger than the predetermined number (YES in S402), the determination value VJ is corrected corresponding to knock count KC (S404).

When knock count KC is equal to or larger than threshold value KC(0), determination value VJ is corrected and reduced by correction amount A(1). This increases the possibility of the determination that the knocking occurred. Therefore, it is possible to increase the frequency of retarding the ignition timing. Consequently, it is possible to reduce the number of times that the knocking occurs.

When knock count KC is smaller than threshold value KC(0), determination value VJ is corrected and increased by correction amount A(2). This reduces the possibility of the determination that the knocking occurred. Therefore, it is possible to increase the frequency of advancing the ignition timing. Consequently, it is possible to increase the output of engine 100.

Figure 15:
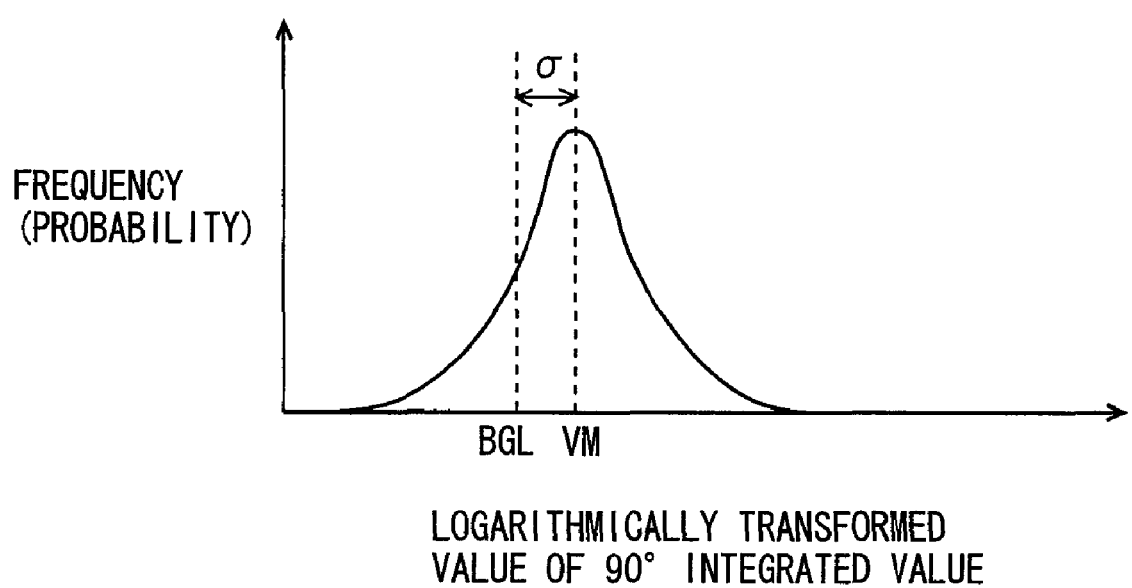
FIG. 15 is a (second) chart shows the frequency distribution of 90° integrated value lpkknk.

In the operation state where the knocking has not substantially occurred, the frequency of 90° integrated value lpkknk exhibits a normal distribution as shown in FIG. 15. Standard deviation σ is small in this frequency distribution.

However, when the load of engine 100 rapidly increases or decreases, the frequency distribution of 90° integrated value lpkknk may change significantly. Therefore, standard deviation σ may increase. The increase in standard deviation σ decreases the BGL. This may suddenly increases knock magnitude N that is calculated by dividing 90° integrated value lpkknk by the BGL. Accordingly, even when the knocking has not occurred, 90° integrated value lpkknk necessarily increases.

When the load of engine 100 rapidly increases, the mechanical vibration itself of engine 100 increases. However, arithmetic processing in engine ECU 200 requires a time.

Therefore, a certain time is required before knock determination level VKD increases according to 90° integrated value lpkknk.

Therefore, when the load changes from a low state to a high state, e.g., because of start of the stopped vehicle, 90° integrated value lpkknk equal to or larger than knock determination level VKD is obtained more times even if the knocking has not occurred. When determination value VJ is corrected in this state, determination value VJ erroneously decreases.

In any case, the ignition timing may be unnecessarily retarded. Therefore, the present embodiment stops the updating of median value VM and standard deviation σ when the load suddenly changes.

When 90° integrated value lpkknk that is detected in the current ignition cycle is smaller than the first threshold value (YES in S200), it is determined that the load of engine 100 has suddenly decreased. In this case, the updating of median value VM and standard deviation σ stops (S202). This can prevent sudden increase in knock magnitude N.

When the updating has been stopped, knock determination level VKD and others are not updated. In this case, even when the load becomes stable, knock determination level VKD may take a value not corresponding to 90° integrated value lpkknk that is actually detected.

Accordingly, when the number of ignition cycles in which 90° integrated value lpkknk smaller than the first threshold value is continuously detected for an independent cylinder is equal to or larger than α, or when this number counted without discrimination between the cylinders is equal to or larger than β (YES in S204), only median value VM is updated (S206). At this time, the update amount of median value VM is set small, and median value VM is updated using 90° integrated value lpkknk that was detected in the last ignition cycle. Thereby, the updating of median value VM is resumed.

However, when the load of engine 100 suddenly changes, the frequency distribution of 90° integrated value lpkknk transitionally changes. When knock count KC is obtained in this state, the accuracy of knock count KC may deteriorate. Therefore, the counting for knock count KC and the counting of ignition cycles stop (S208). Meanwhile, knock determination level VKD as well as first and second threshold values are updated (S210). Thereby, it is possible to obtain knock determination level VKD as well as first and second threshold values corresponding to 90° integrated value lpkknk that is actually detected.

When 90° integrated value lpkknk detected in the current ignition cycle is equal to or larger than the second threshold value (YES in S300), the updating of median value VM and standard deviation σ stops (S302). This can prevent sudden increase in knock magnitude N.

When the count of the ignition cycles in which 90° integrated value lpkknk equal to or larger than the second threshold value is continuously detected for an independent cylinder is equal to or larger than α, or when the number counted without discrimination between the cylinders is equal to or larger than β (YES in S304), only median value VM is updated (S306). In this operation, the update amount of median value VM is set large, and median value VM is updated using 90° integrated value lpkknk that is detected in the current ignition cycle. Thereby, the updating of median value VM is resumed.

Also, the counting for knock count KC and the counting of ignition cycles stop (S308). Since the knock count has been erroneously incremented, knock count KC is decremented (S310). Knock determination level VKD as well as first and second threshold values are updated, using currently updated median value VM (S312).

As described above, the ignition timing control apparatus according to the embodiment calculates median value VM and standard deviation σ of 90° integrated value lpkknk obtained by integrating the magnitude. The BGL is determined by subtracting standard deviation σ from median value VM. Knock magnitude N is calculated by dividing 90° integrated value lpkknk by the BGL. When knock magnitude N is equal to or larger than determination value VJ, the ignition timing is retarded. When 90° integrated value lpkknk smaller than the first threshold value is detected, or when 90° integrated value lpkknk equal to or larger than the second threshold value is detected, the updating of median value VM and standard deviation σ stops. This can prevent such a situation that knock magnitude N calculated according to median value VM and standard deviation σ suddenly increases when the load of the engine suddenly changes. Therefore, it is possible to reduce the frequency of erroneously retarding the ignition timing. Consequently, the ignition timing can be controlled precisely.

Although the present invention has been described and illustrated in detail, it is clearly understood that the same is by way of illustration and example only and is not to be taken by way of limitation, the scope of the present invention being interpreted by the terms of the appended claims.

What is claimed is:
1. An ignition timing control apparatus for an internal combustion engine comprising:
a knock sensor that detects a magnitude of vibration of the internal combustion engine in each ignition cycle; and
a control unit, wherein
said control unit updates a first value representing a median value of the distribution of said magnitude,
updates a second value representing a standard deviation of the distribution of said magnitude,
calculates a third value corresponding to said first and second values,
calculates a fourth value corresponding to said magnitude and said third value,
retards ignition timing when said fourth value is larger than a first determination value,
stops the updating of said second value in at least one of a case when a magnitude that is smaller than a second determination value is detected in current ignition cycle and a case when a magnitude that is equal to or larger than a third determination value is detected in the current ignition cycle,
counts a frequency of detecting a magnitude equal to or larger than a fourth determination value,
corrects said first determination value to reduce the same when the frequency of detecting a magnitude equal to or larger than said fourth determination value is larger than a predetermined frequency, and
stops the counting of the frequency in at least one of a case when magnitudes smaller than said second determination value are continuously detected in a plurality of ignition cycles and a case when magnitudes equal to or larger than said third determination value are continuously detected in a plurality of ignition cycles,
calculates said third value by subtracting a product of a first coefficient larger than zero and said second value from said first value, and
calculates said fourth value by dividing said magnitude by said third value,
said second determination value is obtained by subtracting a product of a second coefficient larger than said first coefficient and said second value from said first value, said third determination value is obtained by adding a product of a third coefficient larger than said second coefficient and said second value to said first value and said fourth determination value is obtained by adding a product of a fourth coefficient larger than said third coefficient and said second value to said first value.

2. The ignition timing control apparatus for the internal combustion engine according to claim 1, wherein said control unit stops the updating of said first value in at least one of a case when magnitude that is smaller than said second determination value is detected in current ignition cycle and a case when a magnitude that is equal to or larger than said third determination value is detected in the current ignition cycle.

3. The ignition timing control apparatus for the internal combustion engine according to claim 2, wherein said control unit updates said first value by an update amount corresponding to a magnitude detected in last ignition cycle, resumes the updating of said first value when magnitudes smaller than said second determination value are continuously detected in a plurality of ignition cycles, and reduces said update amount when the magnitudes smaller than said second determination value are continuously detected in said plurality of ignition cycles.

4. The ignition timing control apparatus for the internal combustion engine according to claim 2, wherein said control unit updates said first value by an update amount corresponding to a magnitude detected in last ignition cycle, resumes the updating of said first value using an update amount corresponding to a magnitude detected in the current ignition cycle instead of a magnitude detected in the last ignition cycle when magnitudes equal to or larger than said third determination value are continuously detected in a plurality of ignition cycles, and increases the update amount corresponding to a magnitude detected in the current ignition cycle when magnitudes equal to or larger than said third determination value are continuously detected in said plurality of ignition cycles.

5. The ignition timing control apparatus for the internal combustion engine according to claim 1, wherein said control unit reduces the counted frequency when magnitudes equal to or larger than said third determination value are continuously detected in a plurality of ignition cycles.

6. An ignition timing control method for an internal combustion engine comprising the steps of:

detecting a magnitude of vibration of the internal combustion engine in each ignition cycle;

updating a first value representing a median value of the distribution of said magnitude;

updating a second value representing a standard deviation of the distribution of said magnitude;

calculating a third value corresponding to said first and second values;

calculating a fourth value corresponding to said magnitude and said third value;

retarding ignition timing when said fourth value is larger than first determination value;

stopping the updating of said second value in at least one of a case when a magnitude that is smaller than a second determination value is detected in current ignition cycle and a case when a magnitude that is equal to or larger than a third determination value is detected in the current ignition cycle, counting a frequency of detecting a magnitude equal to or larger than a fourth determination value, correcting said first determination value to reduce the same when the frequency of detecting a magnitude equal to or larger than said fourth determination value is larger than a predetermined frequency, and stopping the counting of the frequency in at least one of a case when magnitudes smaller than said second determination value are continuously detected in a plurality of ignition cycles and a case when magnitudes equal to or larger than said third determination value are continuously detected in a plurality of ignition cycles, wherein said step of calculating said third value includes the step of calculating said third value by subtracting a product of a first coefficient larger than zero and said second value from said first value, said step of calculating said fourth value includes the step of calculating said fourth value by dividing said magnitude by said third value, said second determination value is obtained by subtracting a product of a second coefficient larger than said first coefficient and said second value from said first value, said third determination value is obtained by adding a product of a third coefficient larger than said second coefficient and said second value to said first value and said fourth determination value is obtained by adding a product of a fourth coefficient larger than said third coefficient and said second value to said first value.

7. An ignition timing control apparatus for an internal combustion engine comprising:

a device to detect a magnitude of vibration of the internal combustion engine in each ignition cycle;

a first calculation device to update a first value representing a median value of the distribution of said magnitude;

a second calculation device to update a second value representing a standard deviation of the distribution of said magnitude;

a third calculation device to calculate a third value corresponding to said first and second values;

a fourth calculation device to calculate a fourth value corresponding to said magnitude and said third value;

a control device to retard ignition timing when said fourth value is larger than a first determination value;

a device to stop the updating of said second value in at least one of a case when a magnitude that is smaller than a second determination value is detected in current ignition cycle and a case when a magnitude that is equal to or larger than a third determination value is detected in the current ignition cycle;

a device to count a frequency of detecting a magnitude equal to or larger than a fourth determination value;

a device to correct said first determination value to reduce the same when the frequency of detecting a magnitude equal to or larger than said fourth determination value is larger than a predetermined frequency; and a device to stop the counting of the frequency in at least one of a case when magnitudes smaller than said second determination value are continuously detected in a plurality of ignition cycles and a case when magnitudes equal to or larger than said third determination value are continuously detected in a plurality of ignition cycles, wherein said third calculation device calculates said third value by subtracting a product of a first coefficient larger than zero and said second value from said first value, said fourth calculation device calculates said fourth value by dividing said magnitude by said third value, said second determination value is obtained by subtracting a product of a second coefficient larger than said first coefficient and said second value from said first value, said third determination value is obtained by adding a product of a third coefficient larger than said second coefficient and said second value to said first value, and said fourth determination value is obtained by adding a product of a fourth coefficient larger than said third coefficient and said second value to said first value.

* * * * *

UNITED STATES PATENT AND TRADEMARK OFFICE
CERTIFICATE OF CORRECTION

| | | |
|---|---|---|
| PATENT NO. | : 7,963,269 B2 | |
| APPLICATION NO. | : 12/263216 | |
| DATED | : June 21, 2011 | |
| INVENTOR(S) | : Rihito Kaneko et al. | |

It is certified that error appears in the above-identified patent and that said Letters Patent is hereby corrected as shown below:

| Column | Line | |
|---|---|---|
| 13 | 35 | Change "cycles of a" to --cycles of α--. |
| 19 | 61 | Before "first determination" insert --a--. |

Signed and Sealed this
Tenth Day of January, 2012

David J. Kappos
*Director of the United States Patent and Trademark Office*